United States Patent
Barsness et al.

(10) Patent No.: US 11,376,526 B2
(45) Date of Patent: Jul. 5, 2022

(54) PLEATED FLUID FILTER ELEMENT AND METHODS

(71) Applicant: Donaldson Company, Inc., Minneapolis, MN (US)

(72) Inventors: James P. Barsness, Dennison, MN (US); Derek O. Jones, Andover, MN (US)

(73) Assignee: Donaldson Company, Inc., Bloomington, MN (US)

(*) Notice: Subject to any disclaimer, the term of this patent is extended or adjusted under 35 U.S.C. 154(b) by 0 days.

(21) Appl. No.: 16/875,091

(22) Filed: May 15, 2020

(65) Prior Publication Data
US 2020/0276525 A1     Sep. 3, 2020

Related U.S. Application Data

(62) Division of application No. 14/682,898, filed on Apr. 9, 2015, now Pat. No. 10,653,979.
(Continued)

(51) Int. Cl.
*B01D 29/07*    (2006.01)
*B65H 45/12*    (2006.01)
(Continued)

(52) U.S. Cl.
CPC ............ *B01D 29/07* (2013.01); *B01D 29/111* (2013.01); *B01D 29/21* (2013.01); *B01D 29/58* (2013.01);
(Continued)

(58) Field of Classification Search
CPC .... B01D 29/07; B01D 39/10; B01D 39/2024; B01D 29/58; B01D 29/21; B01D 29/111;
(Continued)

(56) References Cited

U.S. PATENT DOCUMENTS

| | | | |
|---|---|---|---|
| 4,089,783 | A | 5/1978 | Holyoak |
| 5,252,207 | A | 10/1993 | Miller et al. |

(Continued)

FOREIGN PATENT DOCUMENTS

| | | |
|---|---|---|
| CN | 101039734 A | 9/2007 |
| EP | 0955078 | 11/1999 |

(Continued)

OTHER PUBLICATIONS

"Communication Pursuant to Article 94(3) EPC," for European Patent Application No. 15718718.8 dated May 28, 2018 (4 pages).
(Continued)

*Primary Examiner* — Waqaas Ali
(74) *Attorney, Agent, or Firm* — Mueting Raasch Group

(57) ABSTRACT

A filter element has an upstream and downstream side. A filter media assembly of the filter element has an upstream side and a downstream side and has a first filter media layer and a second filter media layer that is adjacent to the first media layer. A substantial portion of the first layer and second layer are uncoupled, and at least one of the first media layer and second media layer comprises binder fiber. The second media layer has a mean flow pore size equal to or smaller than the first media layer. A support layer system is adjacent to the downstream side of the filter media assembly, and a first wire mesh layer is adjacent to the support layer system. At least the first media layer, second media layer, support layer system, and first wire mesh cooperatively define pleats at a pleat packing density of greater than 125%.

18 Claims, 15 Drawing Sheets

Related U.S. Application Data

(60) Provisional application No. 61/978,094, filed on Apr. 10, 2014.

(51) Int. Cl.
*B01D 39/08* (2006.01)
*B01D 29/11* (2006.01)
*B01D 29/21* (2006.01)
*B01D 29/58* (2006.01)
*B01D 39/20* (2006.01)
*B01D 39/10* (2006.01)

(52) U.S. Cl.
CPC .......... *B01D 39/083* (2013.01); *B01D 39/10* (2013.01); *B01D 39/2024* (2013.01); *B65H 45/12* (2013.01); *B01D 2201/188* (2013.01); *B01D 2201/291* (2013.01); *B01D 2239/0654* (2013.01)

(58) Field of Classification Search
CPC .......... B01D 39/083; B01D 2239/0654; B01D 2201/188; B01D 2201/29; B65H 45/12
See application file for complete search history.

(56) References Cited

U.S. PATENT DOCUMENTS

| | | |
|---|---|---|
| 5,468,397 A | 11/1995 | Barboza et al. |
| 5,543,047 A | 8/1996 | Stoyell et al. |
| 5,552,048 A | 9/1996 | Miller et al. |
| 6,702,941 B1 | 3/2004 | Haq et al. |
| 6,932,907 B2 | 8/2005 | Haq et al. |
| 7,309,372 B2 | 12/2007 | Kahlbaugh et al. |
| 7,314,497 B2 | 1/2008 | Kahlbaugh et al. |
| 7,645,312 B2 | 1/2010 | Hamlin et al. |
| 7,871,515 B2 | 1/2011 | Brandt et al. |
| 7,985,344 B2 | 7/2011 | Dema et al. |
| 8,021,457 B2 | 9/2011 | Dema et al. |
| 8,057,567 B2 | 11/2011 | Webb et al. |
| 8,177,875 B2 | 5/2012 | Rogers et al. |
| 8,206,584 B2 | 6/2012 | Hundley et al. |
| 8,268,033 B2 | 9/2012 | Rogers et al. |
| 8,277,529 B2 | 10/2012 | Rogers et al. |
| 8,460,424 B2 | 6/2013 | Rogers et al. |
| 8,512,435 B2 | 8/2013 | Rogers et al. |
| 8,641,796 B2 | 2/2014 | Rogers et al. |
| 9,056,268 B2 | 6/2015 | Jones et al. |
| 10,653,979 B2 | 5/2020 | Barsness et al. |
| 2003/0085165 A1 | 5/2003 | Shane |
| 2003/0167742 A1 | 9/2003 | Kahlbaugh et al. |
| 2004/0026332 A1 | 2/2004 | Mouhebaty et al. |
| 2005/0132682 A1 | 6/2005 | Paul |
| 2005/0144916 A1 | 7/2005 | Adamek et al. |
| 2006/0096263 A1 | 5/2006 | Kahlbaugh et al. |
| 2006/0096932 A1 | 5/2006 | Dema et al. |
| 2006/0107639 A1* | 5/2006 | Hamlin .............. B01D 46/0036 55/498 |
| 2006/0242933 A1 | 11/2006 | Webb et al. |
| 2007/0039300 A1 | 2/2007 | Kahlbaugh et al. |
| 2007/0104753 A1 | 5/2007 | Flanagan |
| 2008/0023385 A1 | 1/2008 | Baker, Jr. et al. |
| 2008/0053888 A1 | 3/2008 | Ellis et al. |
| 2008/0073296 A1 | 3/2008 | Dema et al. |
| 2008/0245037 A1 | 10/2008 | Rogers et al. |
| 2011/0198280 A1 | 8/2011 | Jones et al. |
| 2011/0215046 A1 | 9/2011 | Rogers et al. |
| 2011/0309012 A1 | 12/2011 | Rogers et al. |
| 2012/0210689 A1 | 8/2012 | Rogers et al. |
| 2012/0312738 A1 | 12/2012 | Rogers et al. |
| 2013/0008846 A1 | 1/2013 | Rogers et al. |
| 2013/0092624 A1 | 4/2013 | Bansal et al. |
| 2014/0197094 A1 | 7/2014 | Rogers et al. |
| 2014/0311963 A1 | 10/2014 | Bortnik et al. |
| 2014/0326661 A1 | 11/2014 | Madsen et al. |
| 2016/0038865 A1 | 2/2016 | Jones et al. |

FOREIGN PATENT DOCUMENTS

| | | |
|---|---|---|
| WO | 97/31695 | 9/1997 |
| WO | 2006/044532 | 4/2006 |
| WO | 2011/100712 | 8/2011 |
| WO | 2013/025445 | 2/2013 |
| WO | 2015/157638 | 10/2015 |

OTHER PUBLICATIONS

"First Office Action," for Chinese Patent Application No. 201580018568.9 dated Jun. 1, 2018 (15 pages) with English translation.

"International Search Report and Written Opinion," for PCT/US2015/025315 dated Oct. 2, 2015 (2 pages).

"International Preliminary Report on Patentability," for PCT Application No. PCT/US2015/025315 dated Oct. 20, 2016 (9 pages).

Pall Corporation, "Ultipleat Liquid Filter Elements for Aerospace," Product Information Sheet, Nov. 27, 2013, www.pall.com, accessed Nov. 30, 2013 (2 pages).

Pall Corporation, "Ultipor Max Filter Elements," Product Data Sheet, Pall Industrial Manufacturing, May 2009 (2 pages).

Western Filter Corp., "Filter Element Disposable & Filter Media," Product No. 325871 Drawing and Notes, at least as early as Apr. 9, 2013 (2 pages).

Western Filter Corp., "Filter Element, Fluid Pressure, Hydraulic Line, and Filter Media," Product No. 326043 Drawing and Notes, at least as early as Apr. 9, 2013 (2 pages).

Western Filter Corp., "Filter Element, Oil," Product No. WF335105 Drawing and Notes, at least as early as Apr. 9, 2013 (1 page).

"Dacihai (a Chinese word dictionary)," Chemical Industries and Textiles, Dacihai Editorial Committee edited, Shanghai Lexicographical Publishing House, 1st Edition, Aug. 2009, Cover, publishing information page, pp. 261-262. English translation provided.

Jiang et al., "Glass fiber application technology," Jan. 2004, China Petrochemical Press, 1st Edition, pp. 827-828. English translation provided.

* cited by examiner

PLEATED FLUID FILTER ELEMENT AND METHODS

CROSS REFERENCE TO RELATED APPLICATIONS

This is a divisional application of U.S. patent application Ser. No. 14/682,898, filed Apr. 9, 2015, which claims the benefit of U.S. Provisional Application No. 61/978,094, filed Apr. 10, 2014, the disclosures of which are incorporated by reference herein in their entirety.

FIELD OF THE INVENTION

The technology disclosed herein generally relates to pleated filter elements. More particularly, the technology disclosed herein relates to a pleated fluid filter element and corresponding methods.

SUMMARY

In one embodiment, a filter element has an upstream side and a downstream side. A filter media assembly of the filter element has an upstream side and a downstream side and has a first layer of filter media and a second layer of filter media that is adjacent to the first media layer. A substantial portion of the first media layer and second media layer are uncoupled, and at least one of the first media layer and second media layer comprises a binder fiber. The second media layer has a mean flow pore size equal to or smaller than the first media layer. A support layer system is adjacent to the downstream side of the filter media assembly, and a first wire mesh layer is adjacent to the support layer system. At least the first media layer, second media layer, support layer system, and first wire mesh cooperatively define pleats at a pleat packing density of greater than 125%.

Another embodiment of the technology disclosed herein relates to a method of forming a filter element. A first layer of filter media, a second layer of filter media, a support layer system, and a first wire mesh layer are provided, where the second media layer has a mean flow pore size smaller than the first media layer. Each of the first media layer, the second media layer, the support layer system, and the first wire mesh layer are folded to form pleats at a linear pleat density of at least about 8 pleats per inch. The pleats of the first media layer, the second media layer, the support layer system, and the first wire mesh layer to a linear pleat density of at least about 17 pleats per inch.

In yet another embodiment of the technology disclosed herein a panel filter element having an upstream side and a downstream side is disclosed, where the filter element has a filter media assembly having an upstream side and a downstream side. The filter media assembly has a first layer of filter media and a second layer of filter media that is adjacent to the first media layer, where a substantial portion of the first media layer and second media layer are uncoupled. At least one of the first media layer and second media layer has a binder fiber. A support layer system is adjacent to the downstream side of the filter media assembly, and a first wire mesh layer is adjacent to the support layer system, where the first media layer, the second media layer, the support layer system, and the first wire mesh layer cooperatively define pleats.

BRIEF DESCRIPTION OF THE DRAWINGS

The invention may be more completely understood and appreciated in consideration of the following detailed description of various embodiments of the invention in connection with the accompanying drawings.

DETAILED DESCRIPTION

Figure 1:
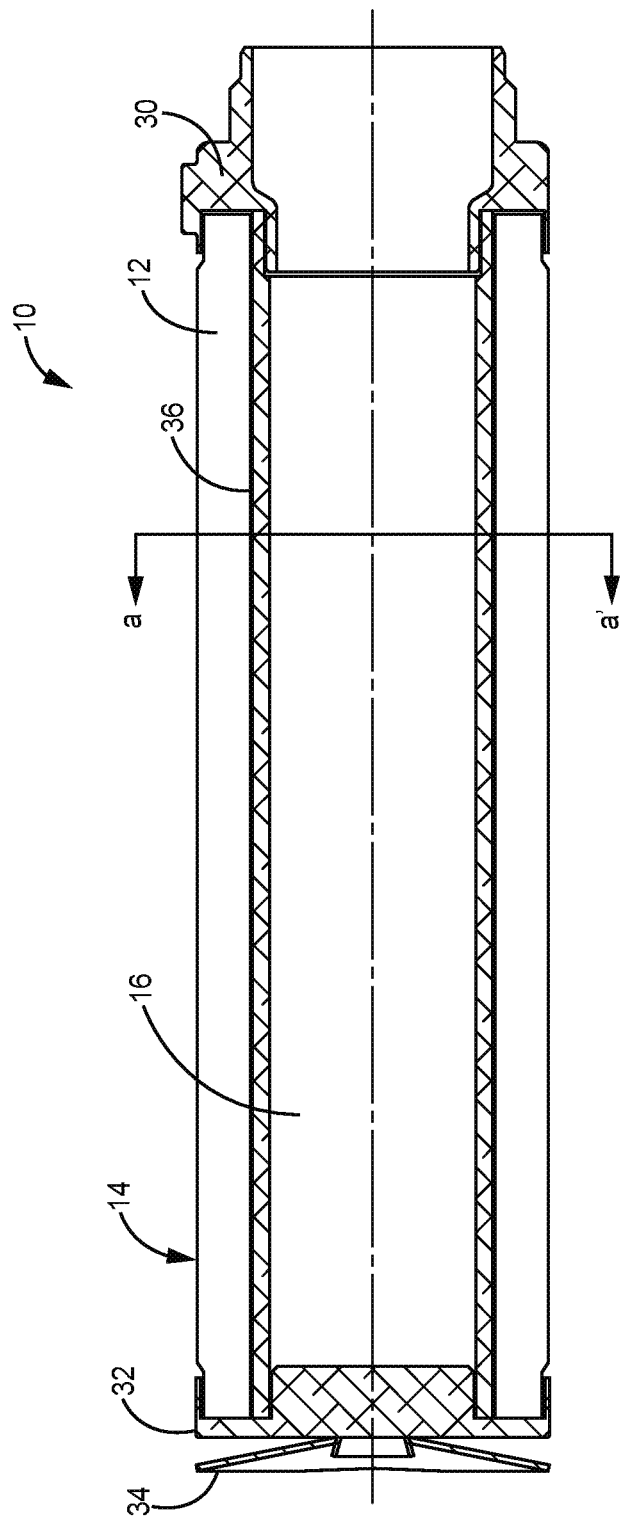
FIG. 1 depicts a first cross-sectional view of an example filter element consistent with the technology disclosed herein
Figure 2:
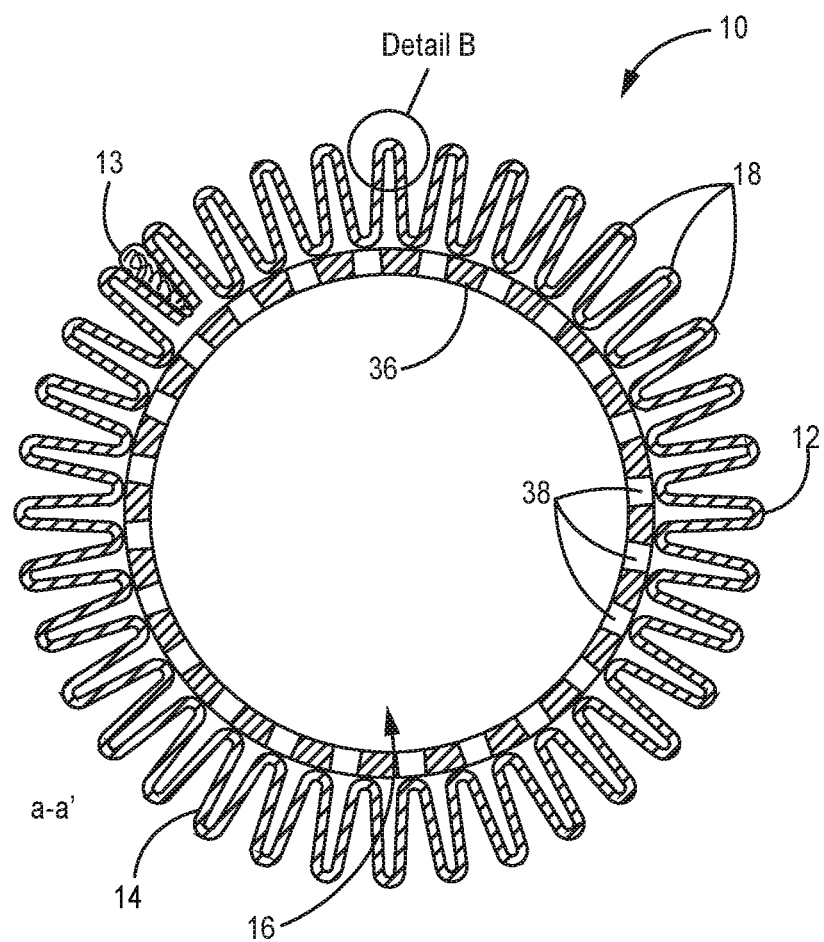
FIG. 2 depicts a second cross-sectional view of the example filter element of FIG. 1.
Figure 3:
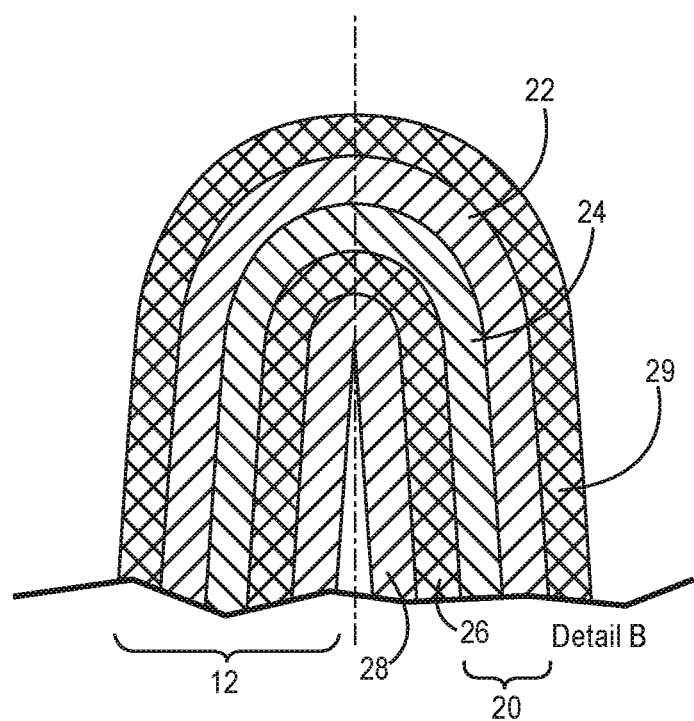
FIG. 3 is a view of Detail B depicted in FIG. 2.

The technology disclosed herein is related to fluid filter elements, particularly liquid filter elements. In a variety of embodiments the filter elements disclosed herein are configured to filter hydraulic fluids including at least flame retardant hydraulic fluids. In some embodiments the filter elements disclosed herein are configured to filter fluids including oil and/or fuel. FIG. 1 is a first cross-sectional view of a filter element 10 consistent with the current technology, and FIG. 2 is a second cross-sectional view of the filter element 10 in FIG. 1 through a-a'. FIG. 3 is a detail view of Detail B in FIG. 2. Referring to FIGS. 1 and 2, the filter element 10 is generally cylindrical in shape and is formed of a plurality of component layers 12 in a tubular structure that provide fluid communication between an upstream side and a downstream side of the filter element 10. In a variety of embodiments the upstream side of the filter element 10 is adjacent the external surface 14 of the component layers 12, on the outside of the filter element 10 and the downstream side of the filter element 10 is an internal passageway 16 defined by the filter element 10. This upstream and downstream configuration relative to the filter element 10 as a whole could certainly be reversed, as would be appreciated by those having skill in the art.

The component layers 12 cooperatively define a plurality of pleats 18 that extend longitudinally along the filter element 10 between two end caps, particularly a first end cap 30 and a second end cap 32, where the first end cap 30 is configured to be coupled to a filter head (not shown), and a spring 34 is configured to be compressibly engaged between the second end cap 32 and a filter canister when the filter element 10 is mounted in communication with a filter head. The component layers 12 can be coupled to the first end cap 30 and the second end cap with one or more adhesives such as epoxy. The component layers 12 can define an elongate seam 13 where edges of the component layers 12 are coupled with a coupling agent such as epoxy. An inner core 36 of the filter element 10 is disposed central to the component layers 12 and is configured to provide structural support to the component layers 12. Generally the inner core 36 defines a plurality of openings 38 to enable fluid communication between the upstream and downstream sides of the filter element 10. In some embodiments, the plurality of openings 38 defined by the inner core 36 are drilled or laser cut. The inner core 36 is tubular in shape and can be constructed of a variety of materials, including aluminum and/or stainless steel, for example. Similarly, the first and second end caps 30, 32 can also be constructed of materials such as aluminum and stainless steel. Additional or alternative materials are also contemplated.

In operation of the filter element 10, hydraulic fluid generally enters the filter element 10 through the external surface 14 of the component layers 12, flows through the plurality of core openings 38 defined by the inner core 36, through the internal opening 16 of the filter element 10, and then exits the filter element 10 through the first end cap 30. Through such flow pattern, the fluid is filtered for use in a variety of systems such as aircraft hydraulic systems.

Figure 14:
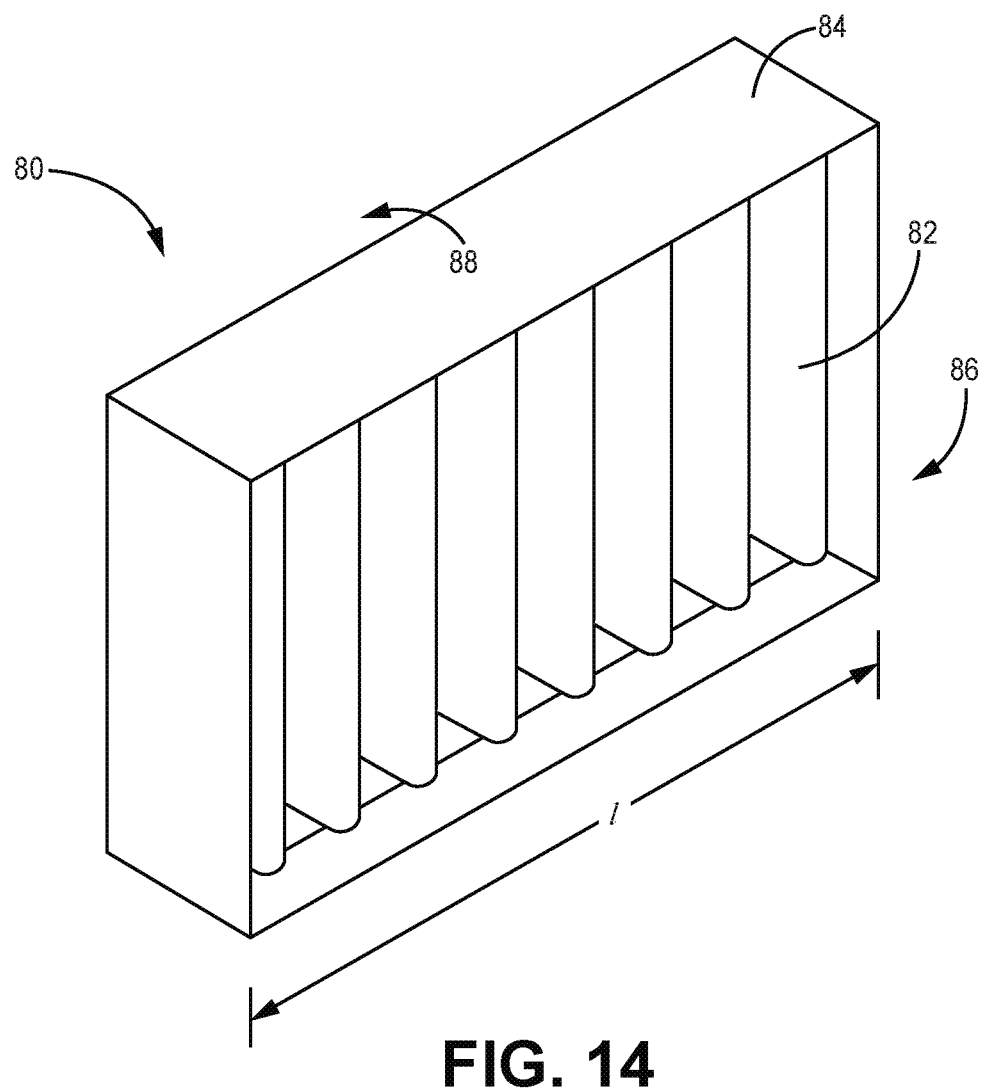
FIG. 14 depicts an example panel filter element consistent with the technology disclosed herein.

It should be noted that while FIGS. 1 and 2 depict a cylindrical filter element, panel filter elements can also be constructed consistently with the technology disclosed herein, such as that depicted in FIG. 14. A panel filter element 80 will generally be constructed of pleated component layers 82 having at least two substantially uncoupled filter media layers, where the component layers 82 are disposed between an upstream side 86 and a downstream side 88 of the panel filter element 80. Panel filter elements can have a frame component 84 to secure the perimeter of the component layers 82. Now FIG. 3 will be described relative to the component layers 12 disclosed in FIGS. 1-2, but those having skill in the art will understand that such discussion will also be relevant to the component layers 82 of the panel filter element configurations.

Referring now to FIG. 3, the component layers 12 of the current embodiment have a first layer of filter media 22, a second layer of filter media 24, a support layer system 26, a first wire mesh layer 28, a second wire mesh layer 29. At least two of the component layers 12 of the filter element 10 can be referred to as a filter media assembly 20 that is composed of the first and second filter media layers 21, 22. Those having skill in the art will appreciate that the positions of each of the component layers 12 relative to the other component layers 12 can be reversed or otherwise altered depending on the desired performance and use of the filter element.

In the current embodiment the second media layer 24 is adjacent to the first media layer 22, where the second media layer 24 is downstream of the first media layer 22. In a variety of embodiments, the first media layer 22 and the second media layer 24 are substantially coextensive in the active regions of the filter media assembly 20, where the "active regions" are defined as the portions of the filter media assembly 20 that are configured to be available for filtration. In a variety of embodiments the first media layer 22 and the second media layer 24 are generally un-laminated and, therefore, in use of the filter element 10, the media layers 24 can move relatively independently from each other. In a variety of embodiments, the filter media assembly 20 can further have a third media layer and, potentially, additional filter media layers to balance desirable filter properties such as efficiency and toughness, with undesirable filter properties such as increasing pressure drop, which will be discussed in more detail, below.

The first media layer 22 and the second media layer 24 can be a variety of different materials and combinations of materials, but in the current embodiment, each of the media layers 22, 24 is a wet-laid non-woven fibrous material, such as that disclosed in co-owned U.S. Pat. No. 8,057,567, which is incorporated herein by reference. In some embodiments, at least one of the first media layer 22 and the second media layer 24 has binder fibers. In at least one of those embodiments, each of the first media layer 22 and the second media layer 24 has binder fibers. The binder fibers can be bicomponent fibers in a variety of embodiments, or other types of binder fibers can be used, as will be appreciated. In some embodiments, at least one of the filter media layers comprises glass fibers. In one embodiment, each of the first media layer 22 and second media layer 24 has polyester fibers and glass fibers.

The downstream media layer, which in the current embodiment is the second media layer 24, can have a mean flow pore size that is equal to or smaller than the upstream media layer, which is the first media layer 22. In at least one embodiment the second media layer 24 has a mean flow pore size between 2.5 and 2.8 microns and the first media layer 22 has a mean flow pore size between 11.3 and 12.0 microns. In at least one embodiment, the maximum pore size of the second media layer 24 can range between 14.1 and 14.6 microns and the maximum pore size of the first media layer 22 can range between 46.6 and 47.2 microns. Flow pore sizes were determined herein with a Capillary Flow Porometer Model Number APP-1200-AEXSC from Porous Materials, Inc., based in Ithaca, N.Y. using CAPWIN Software Version 6.71.122.

Furthermore, in some embodiments the downstream media layer can have a particle efficiency rating that is more efficient than the particle efficiency rating of the upstream media layer, where the particle efficiency rating is determined by ISO 16889 at $\beta_{200}$, and can be rounded up to the nearest integer. In at least one embodiment the ratio of the $\beta_{200}$ particle efficiency rating of the first media layer 22 to the second media layer 24 is greater than 2.

In one particular embodiment, the first media layer is EN0701928 High Temperature XP Media and the second media layer 24 is EN0701929 High Temperature XP Media, each supplied by Donaldson Company based in Bloomington, Minn. EN0701928 is a resin-free wet-laid high temperature XP media having glass and polyester fibers and a mean flow pore size of about 11.71 microns, a maximum pore size of about 46.84 microns, and a $\beta_{200}$ particle efficiency rating of 20 microns. EN0701929 is a resin-free wet-laid high temperature XP media having glass and polyester fibers having a mean flow pore size of about 2.65 microns, a maximum pore size of 14.28 microns, and a $\beta_{200}$ particle efficiency rating of 5 microns. In a variety of embodiments each of the first media layer 22 and the second media layer 24 are substantially free of resin. In a variety of embodiments the filter media assembly itself is substantially free of resin.

The support layer system 26 (See FIG. 3) of the filter element 10 is adjacent to the downstream layer 24 of the filter media assembly 20. The support layer system 26 is generally configured to be chemically compatible with hydraulic fluid and particularly flame retardant hydraulic fluid such as phosphate-ester hydraulic fluids. In some embodiments, the support layer system 26 is substantially coextensive with the filter media assembly 20, particularly in the active regions of the filter media assembly 20. In a variety of embodiments the support layer system 26 is a scrim layer. In an alternate embodiment, the support layer system 26 is a woven material. In some embodiments the support layer system 26 is a woven nylon material. Cellulose materials can also be used as the support layer system 26. In one particular embodiment, the support layer system 26 is a polyester monofilament woven fabric, such as Monodur PES 50 from Tetko Inc., based in Depew, N.Y.

Generally the support layer system 26 can include a woven material to have increased strength compared to, for example, a spun-bonded material. Also, the support layer system 26 will generally be resistant to high temperatures without becoming brittle. In a variety of embodiments the support layer system 26 provides structural support to the filter media assembly 20. In some embodiments the support layer system 26 is configured to limit displacement of the media in the filter media assembly 20 during use. In at least one embodiment, the support layer system can be omitted from a filter element in filter environments having relatively low pressure.

Adjacent to the support layer system 26 is the first wire mesh layer 28. The first wire mesh 28 is generally the outermost layer on the downstream side of the component layers 12 of the filter element 10. In a variety of embodiments the first wire mesh 28 is generally constructed of metal wire, such as stainless steel, and can have a variety of dimensions and specifications. In some embodiments, the first wire mesh 28 can be epoxy-coated steel. Generally the first wire mesh 28 defines a pattern of open areas. In a variety of embodiments, the first wire mesh 28 is substantially coextensive with the filter media assembly 20, particularly in the active regions of the filter media assembly 20. In some embodiments the first wire mesh 28 is not constructed of twilled wire. In some embodiments the first wire mesh 28 layer is a strainer grade and constructed of a304 CRES stainless steel sintered wire having a wire diameter of 0.0055 inches forming an 80×70 mesh that defines an open area of about 34.4%. In one example embodiment, the first wire mesh 28 is obtained from Tetko, Inc. based in Depew, N.Y. The currently-described first wire mesh 28 can have a larger open area than some prior art filter elements, which can improve the clean pressure drop of the filter element 10 in operation.

The second wire mesh layer 29 is positioned on the upstream side of the filter media assembly 20. The second wire mesh 29 can be constructed of metal such as stainless steel. In some embodiments, the second wire mesh 29 can be epoxy-coated steel. Similar to the first wire mesh 28, the second wire mesh 29 generally defines a pattern of open areas and can be substantially coextensive with the filter media assembly 20, particularly the active regions of the filter media assembly 20. In a variety of embodiments, the first wire mesh 28 defines smaller open areas than the second wire mesh 29. An example of the second wire mesh 29 is formed of 0.0055-inch-diameter sintered 304L CRES stainless steel wire arranged in a 42×42 mesh that defines an open area of 59.1%. One particular embodiment is sourced from Tetko, Inc. based in Depew, N.Y.

Generally the first wire mesh 28 and the second wire mesh 29 will have wire thicknesses that are thick enough to impart strength and/or provide protection to the filter media assembly 20 and support layer system 26 during production or use of the filter element, but are thin enough to allow for adequate pleating during production of the filter element 10, which will be described in more detail, below. In some embodiments, the second wire mesh 29 can be omitted from the component layers 12 of the filter element 10.

The component layers 12 of the filter element 10 are generally pleated (which will be described in more detail, below). The pleats have a pleat height ranging from about 0.125 inches to about 3.0 inches, where the pleat height includes the thickness of all of the component layers 12. In some embodiments, the pleats have a pleat height ranging from about 0.2 inches to about 2.5 inches. In some embodiments, the pleats have a pleat height ranging from about 0.25 inches to about 0.35 inches. In one particular embodiment, the pleat height is about 0.285 inches. In another particular embodiment, the pleat height is about 2.0 inches. Other dimensions for the pleat height are also contemplated, and determining the desired pleat height can generally be based on balancing ease of manufacturing with performance gains.

Figure 4:
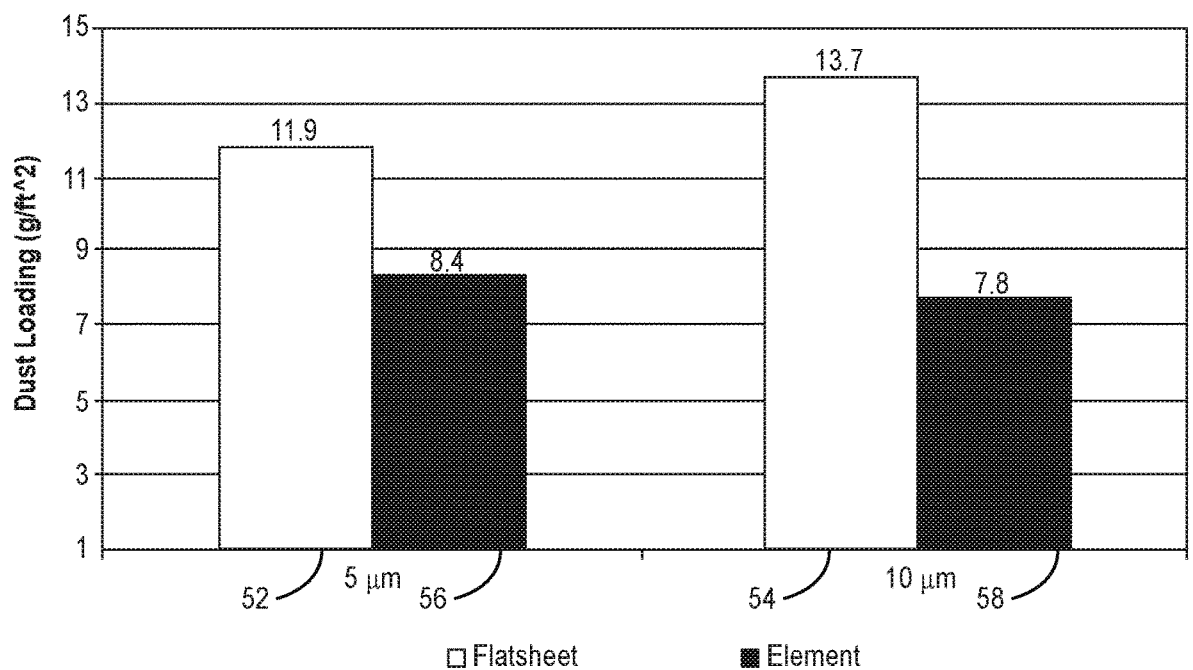
FIG. 4 depicts comparative test data associated with the dust loading capacity of flat sheets of filter media compared to filter elements in accordance with FIGS. 1-3, above.

The relationship between the pore sizes of the first media layer 22 and the second media layer 24 in the current technology was unexpected based on the conventional understandings of how pore sizes in layers of media interact for filtration and pressure drop for flat sheets of filter media. A flat sheet of filter media is one that is not pleated and also not formed in a tubular shape. FIG. 4 depicts comparative test data associated with the dust loading capacity of flat sheets of filter media compared to filter elements in accordance with FIGS. 1-3, above. Dust loading capacity was determined using ISO Standard 16889, where the contaminant was ISO-medium test dust disposed in MIL-PRF-5606H hydraulic fluid having a flow rate of 12 gallons-per-minute (GPM), and the base upstream concentration of dust was 2 mg/L. The media was tested to a terminal pressure drop of 90 psid. The dust loading capacity was determined for each sample per unit area of the sample.

Each part tested had an upstream layer of EN0701928 High Temperature XP media, described above. A first sample 52 and a third sample 56 each had a downstream layer of EN0701929 High Temperature XP media, also described above. The second sample 54 and a fourth sample 58 each had a downstream layer of EN0711086 provided by Donaldson Company based in Bloomington, Minn., having a $\beta_{200}$ particle efficiency rating of about 10 microns, a maximum pore size of about 16.08 microns, and a mean flow pore size of about 4.65 microns. Each sample 52, 54, 56, 58 had a support layer system adjacent to the downstream layer of media, where the support layer system was the Monodur PES 50 from Tetko, discussed above. The first sample 52 and the second sample 54 were flat sheets of the media layers and the third sample 56 and the fourth sample 58 were arranged in an element configuration consistent with FIGS. 1-3. The first sample 52 and the second sample 54 omitted the first and second wire mesh layers disclosed in FIGS. 1-3, and such omission is expected to have had little impact on filter performance. The media layers in all of the samples were substantially uncoupled.

As is demonstrated by the data reflected in FIG. 4, the comparative dust loading of the flat sheets of media is not a predictor of the comparative dust loading of the media arranged in pleated filter elements. In particular, while the media of the second sample 54 had better dust loading than the media in the first sample 52, that advantage did not translate to a media configuration consistent with FIGS. 1-3. Indeed, when configured in a pleated filter element, the media layers having an upstream-to-downstream $\beta_{200}$ particle efficiency rating ratio of 4 performed better than the media layers having an upstream-to-downstream $\beta_{200}$ particle efficiency rating ratio of 2. It can follow, in some embodiments of the technology disclosed herein, the upstream-to-downstream $\beta_{200}$ particle efficiency rating ratio is greater than 2, or even greater than 3, or sometimes even greater than 3.5. In some embodiments the ratio of the mean flow pore size of the first media layer 22 to the second media layer 24 is greater than 2.4, greater than 2.6, greater than 2.8, greater than 3.0, greater than 3.2, greater than 3.4, greater than 3.7, or even greater than 4.0. In some embodiment the ratio of the maximum pore size of the first media layer 22 to the second media layer 24 is greater than 2.8, greater than 2.9, or greater than 3.0.

Figure 15:
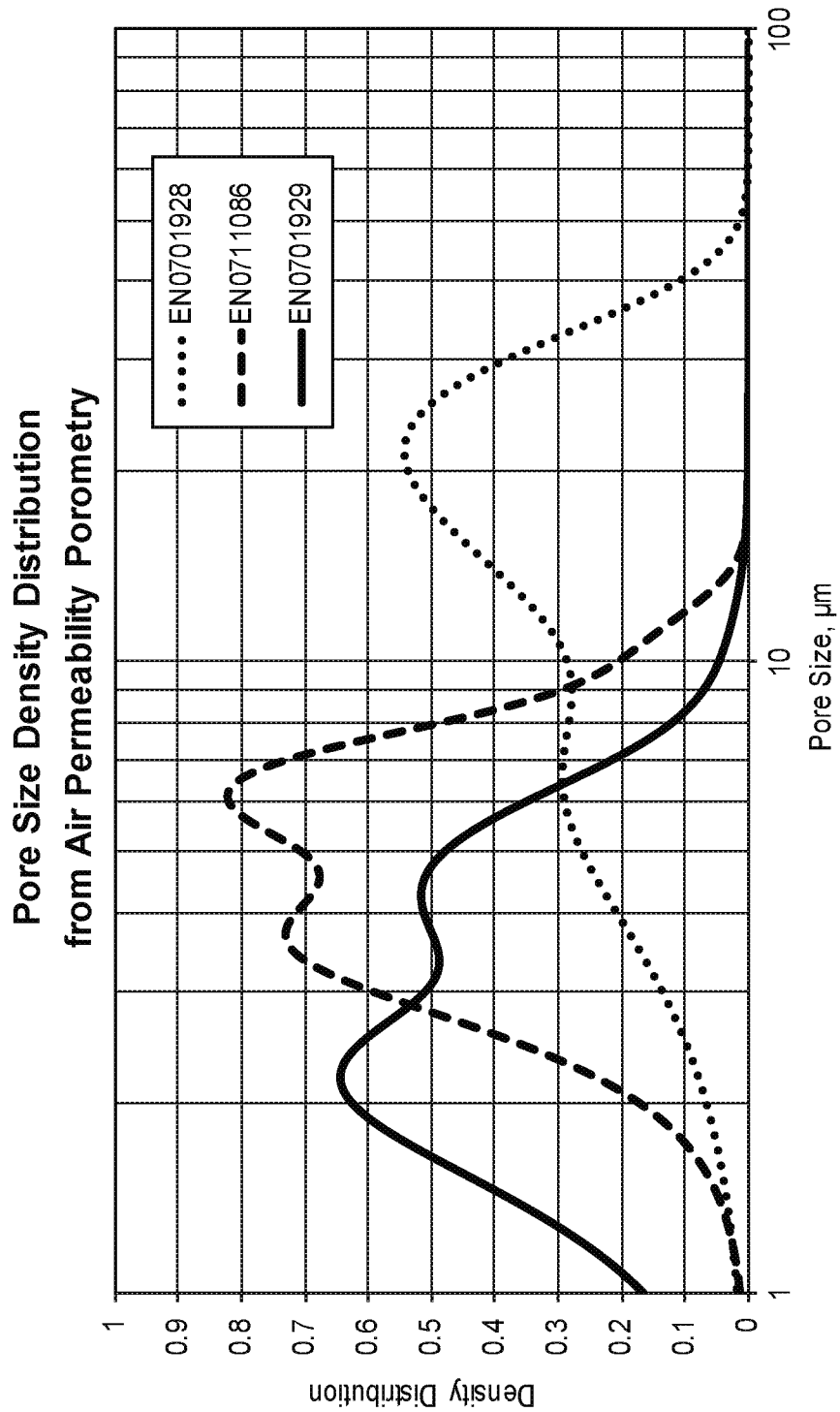
FIG. 15 is a comparative graph depicting the pore size density distributions of three filter media layers.

While the ratios of the $\beta_{200}$ particle efficiency rating and the mean flow pore sizes of the upstream and downstream media layers can impact the performance characteristics of the filter media assembly, there are a variety of other relationships between the upstream and downstream media layers that can also contribute to filter properties. FIG. 15 depicts the pore density distribution for each of the media layers EN0701928, EN0701929 and EN0711086 as determined with the Capillary Flow Porometer from Porous Materials, Inc., described above. Another ratio that can impact filter performance of the layers is, for example, the mode pore size of each of the layers. For example, it can be desirable to have an upstream-to-downstream mode pore size ratio of greater than 2.3, greater than 4, greater than 6, or even greater than 8.

Figure 5:
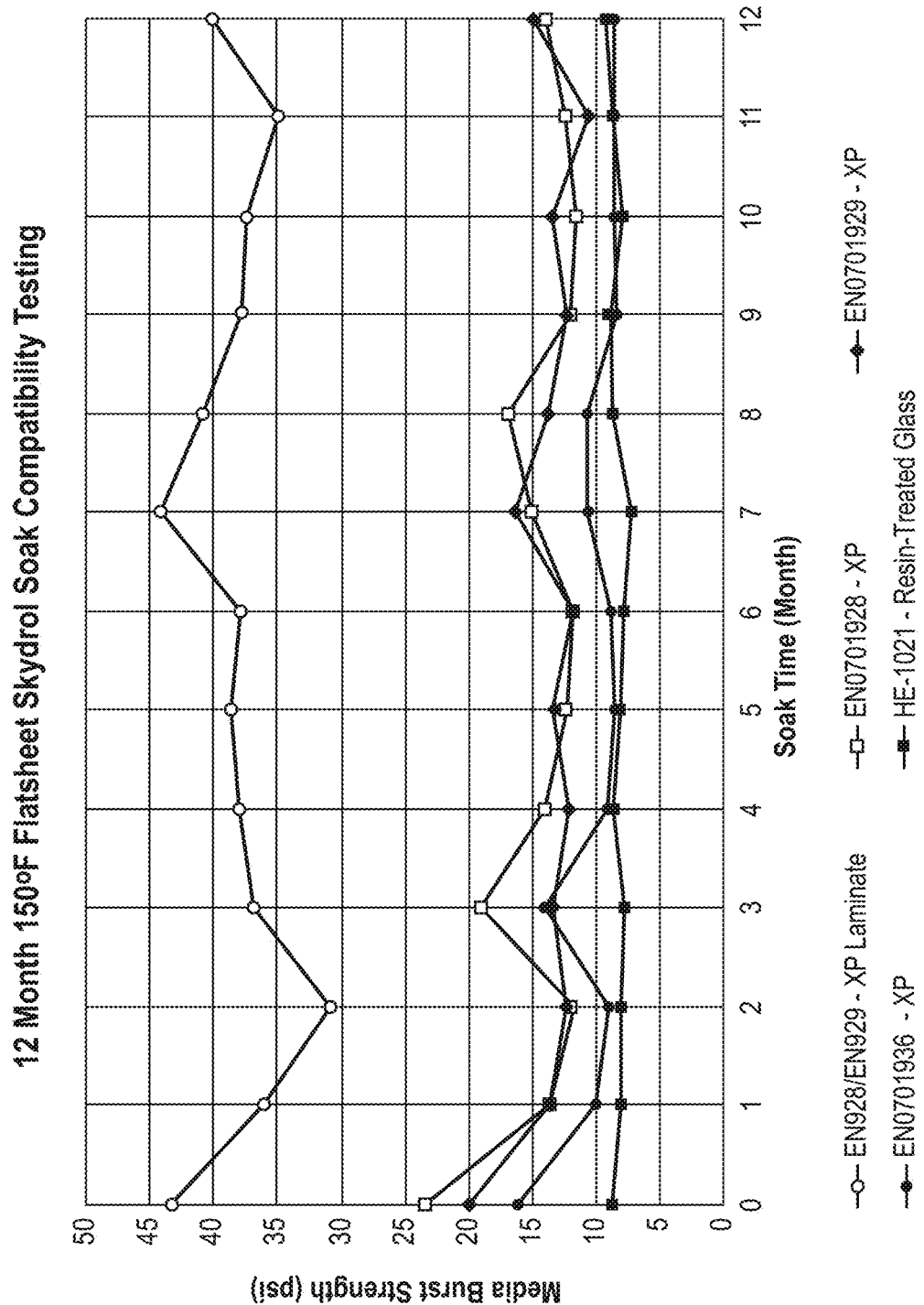
FIG. 5 depicts comparative test data of burst strength over time related to chemical compatibility of the various types of media layers at an elevated temperature.

FIG. 5 depicts media burst strength data over time of flat sheets of media layers consistent with the technology disclosed herein compared to a fiberglass filter media. Each filter media was soaked in Skydrol phosphate-ester hydraulic fluid (manufactured by Eastman Chemical Company based in Kingsport, Tenn.) at 150° F. for twelve months, and in monthly intervals the burst strength of the media was tested. Burst strength was determined using ASTM D774-97. EX2421 is a resin-free two-layer laminate of EN0701928 and EN0701929, both of which are described above. EN0701936 is another example resin-free, wet-laid media with glass fibers and binder fibers provided by Donaldson Company in Bloomington, Minn. HE-1021 is a filter media with micro-fiberglass and an acrylic resin binder sourced from Hollingsworth & Vose Co. in Greenwich, N.Y. As demonstrated, the fiberglass media, HE-1021, had the lowest burst strength, which remained low throughout the twelve-month duration of the testing. This testing demonstrates the relatively increased toughness of the media samples consistent with the current application.

Figure 6:
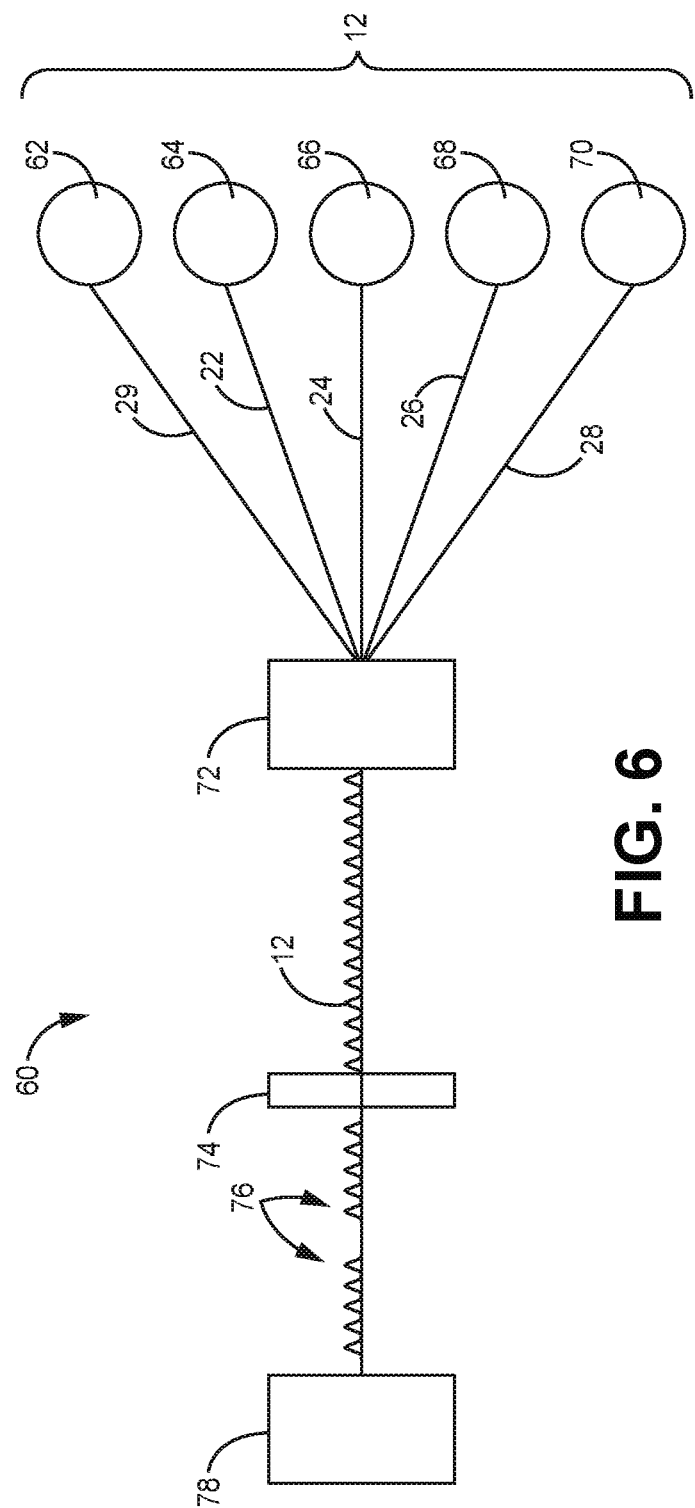
FIG. 6 depicts a schematic of a system for producing a filter element consistent with the technology disclosed herein.

The filter element 10 consistent with FIGS. 1 and 2 is generally formed through the method that will now be described with reference to FIGS. 6 and 7. The first media layer 22, the second media layer 24, the support layer system 26, and at least the first wire mesh 28, which are the component layers 12, are obtained and each are provided on feed rollers 64-70. In some embodiments the second wire mesh 29 is provided as well via a feed roller 62. As described above, the second media layer 24 generally has a smaller mean flow pore size than the first media layer 22, where the ratio of the mean flow pore size of the first media layer 22 to the second media layer 24 is generally greater than 2.4.

In a variety of embodiments each of the component layers 12 are fed from their respective rollers 62-70 to a pleater 72, where the component layers 12 are folded to a particular linear pleat density. The component layers 12 are generally fed into the pleater together in their respective positions relative to each other. So, in accordance with the embodiments in FIGS. 1-3, the support layer system 26 would be layered between the first wire mesh 28 and the second media layer 24, and the first media layer 22 would be layered between the second media layer 24 and the second wire mesh 29. The component layers 12 are then folded together, such as through co-pleating in the pleater 72. In at least one embodiment the pleater 72 is a blade pleater, although other equipment can also be used. In a variety of embodiments the component layers 12 are folded to form linear pleat density of at least about 8 pleats per inch (PPI). In some embodiments the component layers 12 are folded to form pleats at a linear pleat density of at least about 13 PPI. In some embodiments heating while folding the component layers is not necessary, while in some other embodiments it may be desirable to heat the component layers 12 during pleat formation.

Following folding of the component layers 12, the component layers 12 are fed out of the pleater 72. The component layers 12 are then cut at a cutting station 74, where the component layers 12 are cut into segments 76 having a desired length that will generally correspond to the desired circumference of the resulting filter element (See FIGS. 1-2) at a particular pleat density, where the pleat density measurements will be described in more detail, below. After cutting, the component layers 12 can be substantially coextensive, at least at active filtering regions of the component layers.

Figure 7:
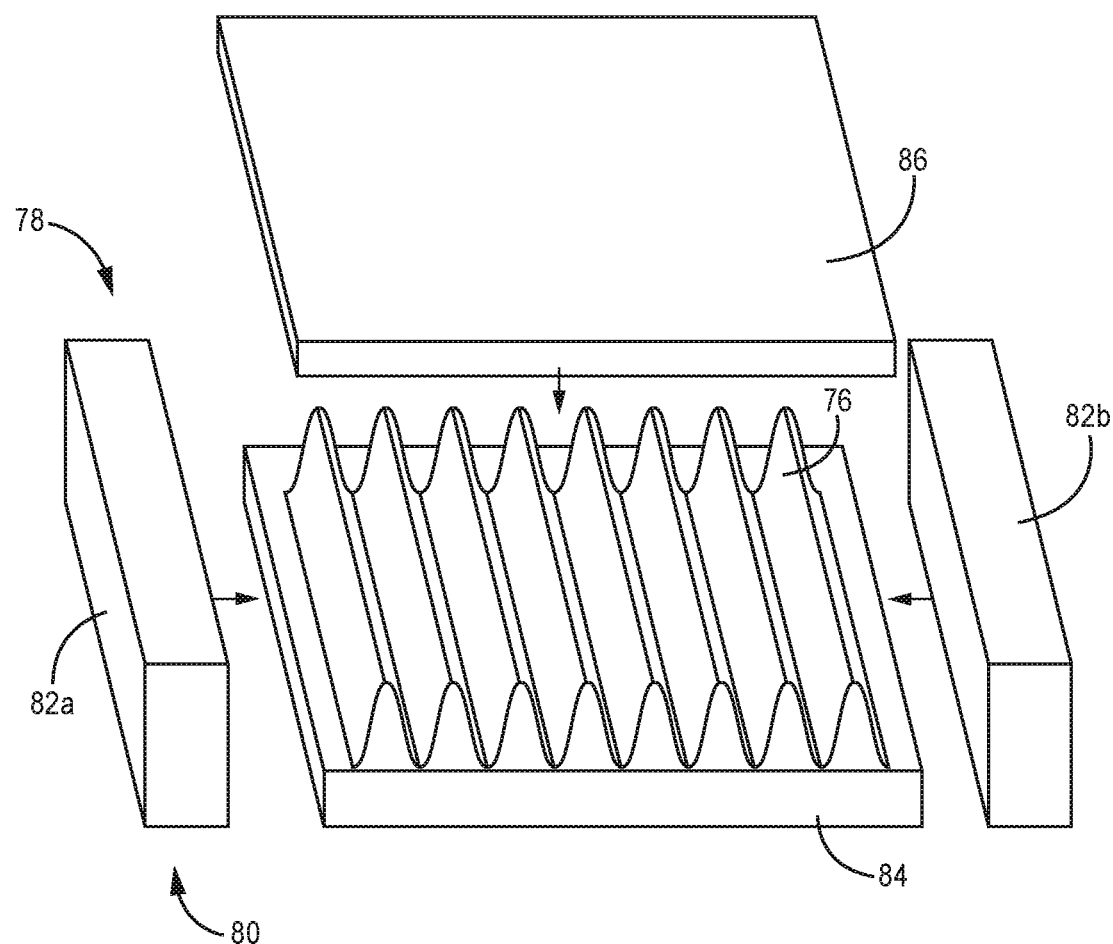
FIG. 7 depicts a schematic of part of the system depicted in FIG. 6.

After the folding and cutting of the component layers 12, the segments 76 of the component layers 12 are compressed at a compression station 78, which is depicted in more detail in the schematic of FIG. 7. The compression station 78 generally has a receiving surface 84 that is configured to receive the segment 76 of the component layers 12. A first compression surface 82a and a second compression surface 82b are configured to linearly translate along the receiving surface 84 from each side of the segment 76 in a direction orthogonal to the folds and compress the segment 76 to a desired linear pleat density. For example, in at least one embodiment the segment 76 of component layers 12 is compressed to a linear pleat density of at least about 17 pleats per inch. In at least one embodiment a ceiling plate 86 of the compression station 78 advances from above the segment 76 to maintain the vertical position and pleat height of the segment 76 as the segment 76 is being compressed by the compression surfaces 82a, 82b.

The compression of the segments 76 of the component layers 12 generally establishes the desired pleat density of the resulting filter element. Compression of the segments 76 of the component layers 12 can also refine the shape of the pleat profile to be more regular and consistent. The resulting compressed pleated segments 76 of the component layers 12 are then formed into the filter element, such as a cylindrical filter element consistent with FIGS. 1-3, or a panel filter element (see FIG. 14). To manufacture a panel filter element from the pleated segments 76, the perimeter of the pleated segments 76 are secured in a filter frame component (see element 84 in FIG. 14, for example). In a variety of embodiments, the perimeter of the pleated segment 76 would be secured in the filter frame component with epoxy or other adhesive, although the substantial portion of the component layers would remain uncoupled, particularly areas of the component layers that are configured to be actively filtering. In one embodiment the filter frame component acts as a mold while the adhesive cures and is then removed before the filter is used. In another embodiment the filter frame remains a part of the filter element after the adhesive cures.

To create a cylindrical filter element consistent with FIGS. 1-3, the segments 76 are into a substantially tubular shape around an inner core 36 (See FIGS. 1 and 2), where the ends of the segment 76 can be adhered together to form an elongate seam 13 along the length of the filter element 10. The opposite ends of the tube formed by the segment 76 of the component layers 12 can be coined to fit within the end caps 30, 32. In a variety of embodiments an adhesive is applied between each end cap 30, 32 and the opposite ends of the tube of component layers 12. In at least one embodiment the adhesive is an epoxy resin.

As will be understood by those having skill in the art, after the compression step the segments 76 of component layers 12 will generally relax as time passes. As such, if more than a particular time limit passes, the component layers 12 can be recompressed to again achieve the desired pleat density. Or, in the alternative, the segments 76 can be over-compressed to a relatively high pleat density, and formed into a filter element once the component layers 12 relax to a desirable pleat density. Other approaches can also be used. The specific component layers 12 of the current technology appear to have the toughness and compressibility to withstand the compression step disclosed herein. This may partially be attributed to the configuration of the wire meshes 28, 29, the strength of the support layer system, and the strength and compressibility of the filter media assembly itself.

While epoxy or other adhesive can couple the end caps 30, 32 (see FIG. 1) to the component layers 12 and the elongate seam (see FIG. 2) of the component layers 12, generally each of the component layers 12 are not bonded to any other component layers 12 within the active regions of the filter element 10, such that each layer is allowed to shift relatively independently of the other layers during filtration processes. It will be understood by those having skill in the art that the elongate seam 13 of the component layers 12 and the region of the component layers 12 coupled to the end caps 30, 32 are not generally considered active regions of the component layers. As such, the component layers 12 of the filter element 10 can be described as substantially unbonded.

Pleat packing density is a concept that generally describes how tightly the pleats are packed together in a filter element, taking into consideration the total thickness of the component layers 12. For a cylindrical filter element, pleat packing density describes how tightly the pleats are packed onto the inner core of the filter element, and for a panel filter element 80 (see FIG. 14), pleat packing density describes how tightly the pleats are packed along the length l of the filter element 80. Stated differently, the pleat packing density is a calculation describing how much space the pleated component layers 12 use compared to how much space is available either (1) along the length l of a panel filter element or, (2) in a cylindrical filter element, around the circumference of the inner core 14 of the filter element 10 (FIG. 2). Generally, when pleat packing density is greater than 95%, the pleated layers start to compress into each other. Filter elements consistent with the technology disclosed herein generally have a pleat packing density that is at least 95%, at least 100%, at least 110%, and often at least 125%. In a particular embodiment, the filter elements disclosed herein have a pleat packing density of at least 130%. For a cylindrical filter element, pleat packing density is described by the following equation:

$$\gamma_p = \frac{2 \cdot n \cdot t}{\pi \cdot (d_i + 2 \cdot t)} = \frac{2 \cdot n \cdot (t_{w1} + t_m + t_{w2} + t_s)}{\pi \cdot (d_i + 2 \cdot (t_{w1} + t_m + t_{w2} + t_s))}$$

where: $t_m$=filter media assembly 20 thickness;
$t_s$=support layer system 26 thickness;
$t_{w1}$=first wire mesh 28 thickness;
$t_{w2}$=second wire mesh 29 thickness;
t=total thickness of component layers 12;
n=total number of pleats in the filter element 10;
$d_i$=outer diameter of inner core 36 of the filter element 10; and
$\gamma_p$=pleat packing density [%].

As can be seen in the equation above, the denominator is the outer circumference of the inner core 36 (see FIG. 2), which is adjusted to account for the thickness of the component layers 12. The numerator of the above equation is the total space taken by the component layers around the adjusted circumference of the inner core 36, which accounts for the fact that in each pleat there are two layers of the component layers 12. The pleat packing density generally includes the two pleats on each side of the elongate seam 13 (see FIG. 2) of the filter element 10.

In a panel filter element 80 (FIG. 14), pleat packing density can be calculated with the following equation:

$$\gamma_p = \frac{2 \cdot n \cdot t}{l} = \frac{2 \cdot n \cdot (t_{w1} + t_m + t_{w2} + t_s)}{l}$$

where l is the length of the filter element 80 in the direction that the pleats are packed. In a variety of embodiments, a panel filter element 80 consistent with the technology disclosed herein can be constructed to have a lower pleat packing density than a cylindrical filter element consistent with the technology disclosed herein. Generally the pleat packing density of a panel filter element 80 consistent with the current technology will have a pleat packing density of at least 85%.

In addition to pleat packing density, the number of pleats in a filter element can be described in terms of linear pleat density, where, in a cylindrical filter element, the total number of pleats in the filter element 10 (FIGS. 1-2) is divided by the outer circumference of the inner core 36 of the filter element 10 and, in a panel filter element 80 (FIG. 14), the total number of pleats in the filter element is divided by the length l of the filter element in the direction in which the pleats are packed. The linear pleat density can be described in pleats-per-inch (PPI). In a variety of embodiments, the filter elements described herein have a linear pleat density of greater than 12 PPI. In some embodiments, the filter elements described herein have a linear pleat density of greater than 16 PPI. In at least one embodiment, a filter element has a linear pleat density of about 18 PPI. The linear pleat density also describes the pleat density of the component layers 12 prior to formation to the tubular structure consistent with the filter elements disclosed herein. Table 1 shows comparative data of pleat packing density and linear pleat density for the current technology and some known cylindrical filter elements.

TABLE 1

| Description | Total Pleats | PPI | Pleat Packing Density |
|---|---|---|---|
| Pall No. AC9780F15Y6 | 60 | 16.1 | 103.2% |
| Prod. No. WF335105 | 60 | 16.1 | 116.5% |
| 7-Micron Bulk Liquid Media | 70 | 10.0 | 105.7% |
| 4-Micron Bulk Liquid Media | 59 | 8.4 | 125.1% |
| 5 micron XP | 65 | 17.4 | 136.9% |
| 10 micron XP | 65 | 17.4 | 138.0% |

Each of the above filter elements has both an upstream and downstream wire mesh and can be used in hydraulic fluid filtration. Pall Product No. AC9780F15Y6 has fiberglass media sandwiched between scrim with both upstream and downstream wire mesh that is available through Pall Corporation, headquartered in Port Washington, N.Y. Product No. WF335105 is a glass & resin media provided by Donaldson Company based in Bloomington, Minn., which has HE-1021 fiberglass filter media, described above (from Hollingsworth & Vose) sandwiched between Monodur PES 50 scrim layers, also described above (from Tetko, Inc.). The 7-micron bulk liquid filter element is also a product of Donaldson Corporation, based in Bloomington, Minn., which has a single layer of filtration media laminate sandwiched between upstream and downstream wire mesh, where the filtration media has a $\beta_{200}$ particle efficiency rating of 7 microns. The 4-micron Bulk Liquid filter element is also a product of Donaldson Corporation and has a $\beta_{200}$ particle efficiency rating of at least 4 microns and is constructed of four layers of filtration media with a downstream scrim and an epoxy-coated wire mesh on each of the upstream and downstream sides. The 5-micron XP filter element is a filter element consistent with FIGS. 1-3 and 6-7, described above, which has a downstream layer of EN0701929 media and an upstream layer of EN0701928 media with a woven support layer and two wire mesh layers, as described, where a substantial portion of the upstream and downstream medias are uncoupled. Lastly, the 10-micron XP filter element was configured similarly to the 5-micron XP filter element, except that the downstream layer of EN0701929 was replaced with EN0711086, having a $\beta_{200}$ particle efficiency rating of about 10 microns.

As is visible in Table 1, the filter elements consistent with the technology disclosed herein have relatively high linear pleat densities and pleat packing densities than conventional filter elements. The relatively high pleat density of the technology disclosed herein defies conventional wisdom that compressing the filter media, thereby increasing the pleat density, would decrease performance of the resulting filter element. Expectations were that a pleat density increase would lead to an increase in pressure drop and cause the dust holding capacity of the filter element to plateau, if not fall. Such expectations, combined with the increased cost associated with increasing the amount of material per filter element, prevented further inquiry.

Figure 8:
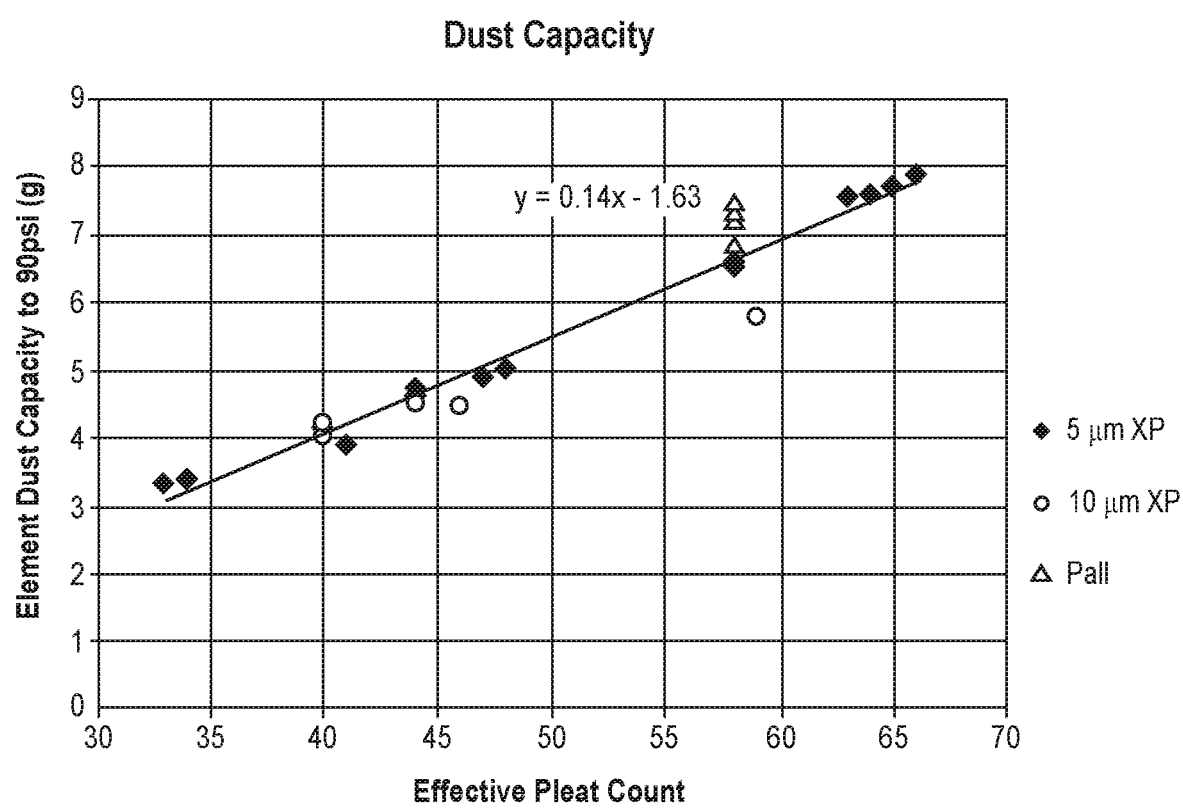
FIG. 8 depicts graphical data of comparative test results of dust loading capacity compared to pleat count of various filter elements.
Figure 9:
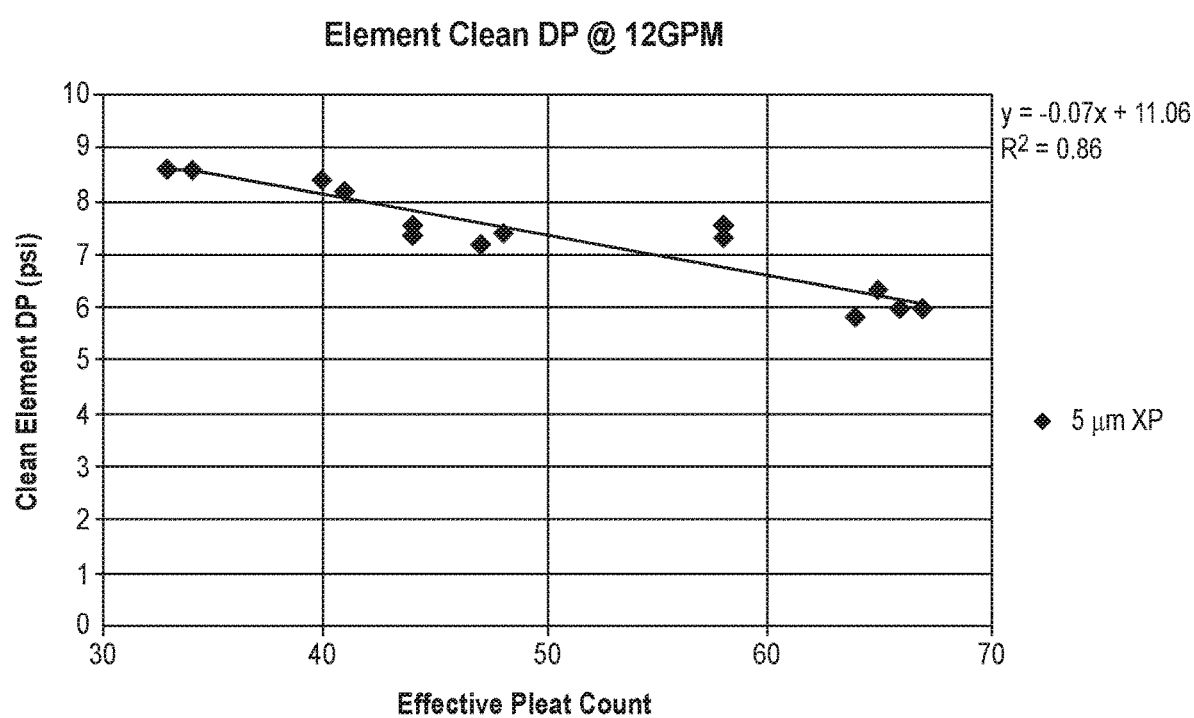
FIG. 9 is a graph demonstrating test results associated with clean pressure drop compared to pleat count in various filter elements.

Studies were conducted on filter elements consistent with FIGS. 1-3 at differing pleat densities reflected by a variation in the number of pleats within the filter element, the results of which are found in FIGS. 8-9. FIG. 8 shows the filter element dust capacity at different effective pleat counts for the 5-micron XP filter element and a 10-micron XP filter element, each of which are described above. FIG. 8 further shows comparative data with Pall Product No. AC9780F15Y6, described above with reference to Table 1.

FIG. 9 depicts filter element clean pressure drop at the different effective pleat counts for the 5-micron XP filter element, where the clean pressure drop was determined at the start of testing of the dust capacity reflected in FIG. 8. The effective pleat count reflected in FIGS. 8 and 9 generally adjusts the total pleat count by subtracting the pleat associated with the elongate seam 13 (see FIG. 2), which renders such pleat unavailable for filtration. The 5-micron XP and 10-micron XP filter elements were constructed using the method described above, where each filter element had component layers including a first media layer, a second media layer, a support layer system, a first wire mesh, and a second wire mesh. Each of the component layers were arranged in a pleated arrangement in the form of a tube, with the first wire mesh on the downstream-most side of the filter element and the second wire mesh on the upstream-most side of the filter element.

Dust capacity depicted in FIG. 8 was determined using ISO Standard 16889 where the contaminant was ISO-medium test dust disposed in MIL-PRF-5606H hydraulic fluid. A flow rate of 12 GPM and base upstream concentration of 2 mg/L was used. The terminal pressure drop was 90 psid. It was expected that the results of the test would demonstrate a plateau of dust holding capacity as the number of pleats in the filter element were increased (leading to compression of the component layers). Surprisingly, a strong linear trend was observed despite the overcrowding of the pleats. Turning to FIG. 9, surprising results were also observed in testing the clean pressure drop of the 5-micron XP filter elements at the beginning of the dust capacity test. It was expected that the clean pressure drop would increase as the pleats became overcrowded, but the evidence demonstrates that the opposite was true.

Figure 10:
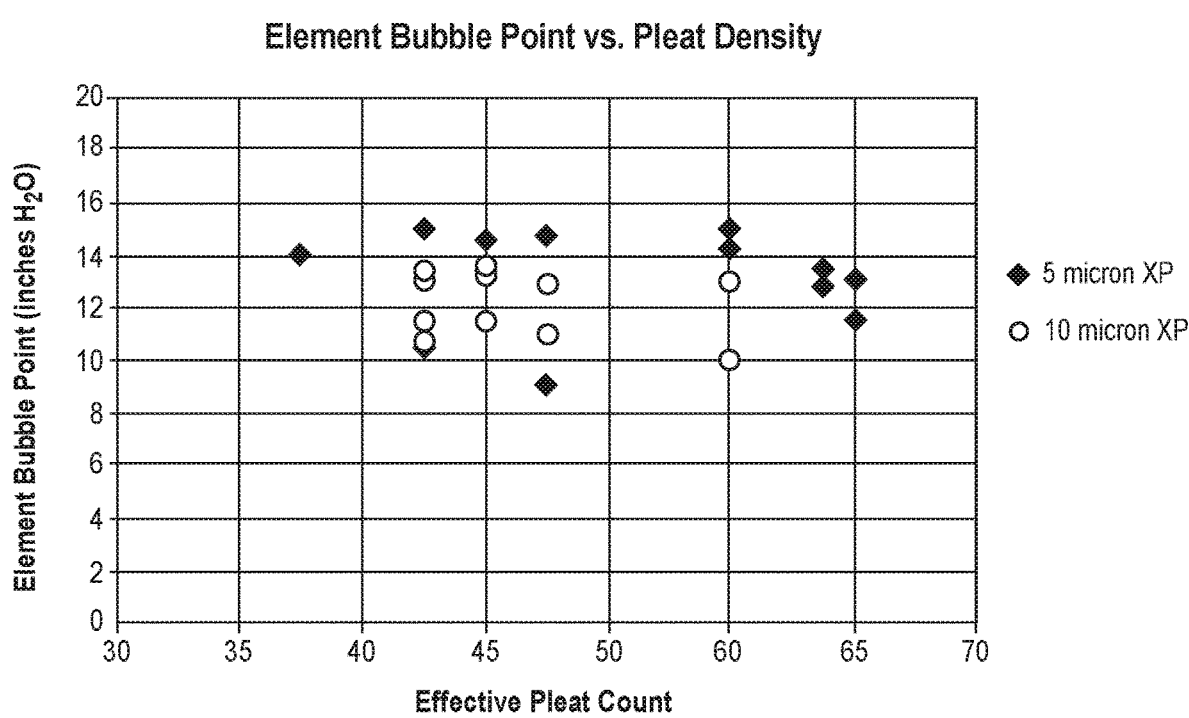
FIG. 10 is a graph demonstrating test results associated with Bubble Point compared to effective pleat count in various filter elements.

Bubble point was also determined for filter elements consistent with FIGS. 1-3 at different effective pleat counts using isopropyl alcohol and executed consistently with Bubble Point Standard ISO 2942-2004, the results of which are found in FIG. 10. Bubble point can be used to check filter element integrity, particularly with respect to manufacturing damage to the filter media or poor seals within the filter element. FIG. 10 shows data points relevant to bubble point data associated with the filter media in 5-micron XP filter elements and 10-micron XP filter elements at different linear pleat densities, where the seals of the filter element did not determine the bubble point. In other words, the seals of the filter element were adequately sealed such that the bubble point was determined by the component layers within the filter element rather than a seal failure. Based on the data points, there does not appear to be a strong correlation between a lower bubble point and an increased linear pleat density. Such a finding indicates that the increased stresses that the component layers are under during the compression step (described above with reference to FIG. 7) and when compressed within the filter element does not appear to negatively impact the integrity of the media, as measured by bubble point and confirmed with filtration efficiency. Stated differently, a conclusion has been drawn that the filter media consistent with the technology disclosed herein retains its integrity through the manufacturing process as measured by bubble point. Such a conclusion is based on the fact that under lower compression, i.e., lower linear pleat density and/or lower pleat packing density, the bubble point of the media is approximately the same as media in a filter element under higher compression, i.e., higher linear pleat density and/or higher pleat packing density. The phrase "approximately the same" is meant to mean that the bubble point of the media of the filter element under higher compression is no less than 65%, 60%, or 75% of the media of the filter element under lower compression.

Figure 11:
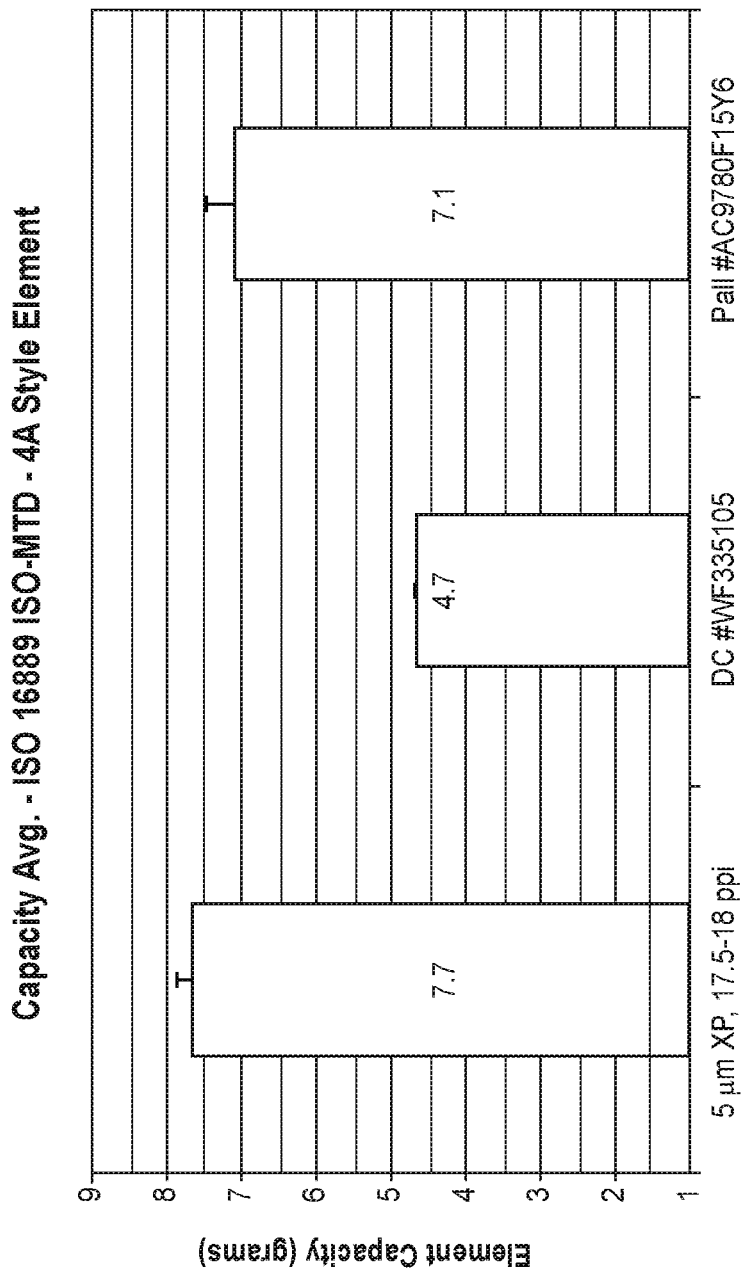
FIG. 11 depicts comparative test data associated with dust holding capacity associated with the technology disclosed herein.
Figure 12:
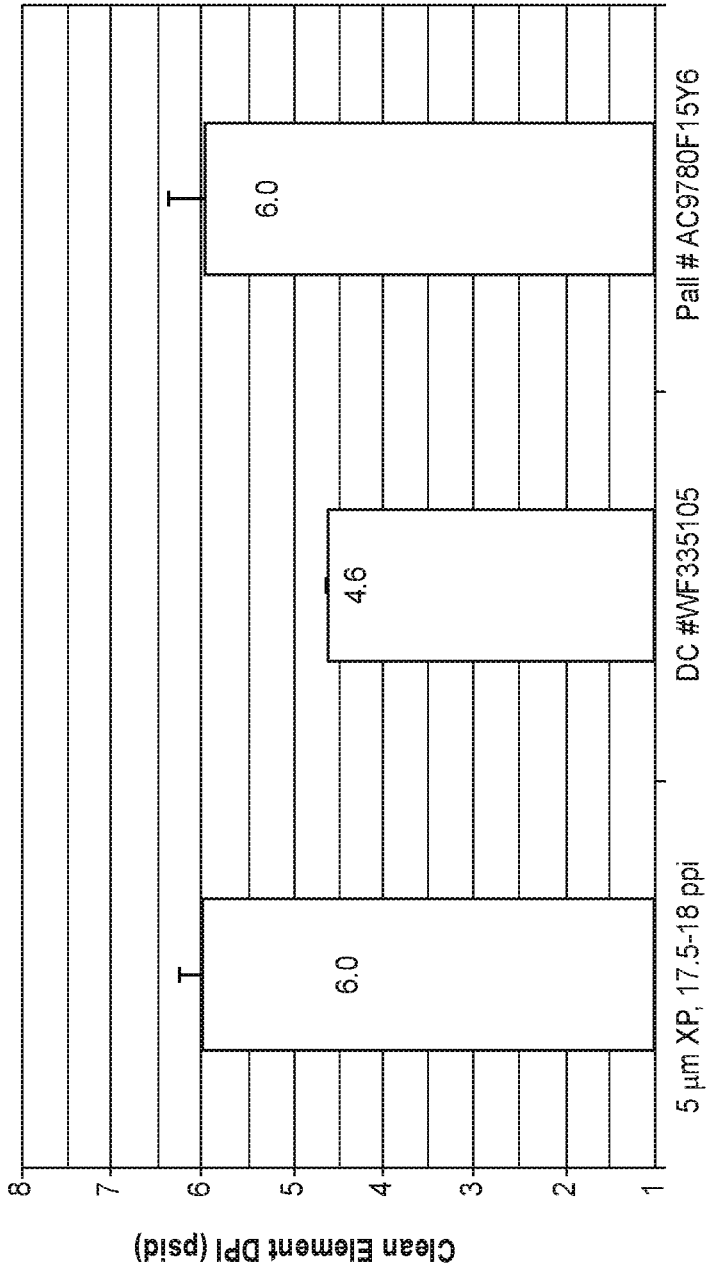
FIG. 12 depicts comparative test data associated with clean pressure drop associated with the technology disclosed herein.
Figure 13:
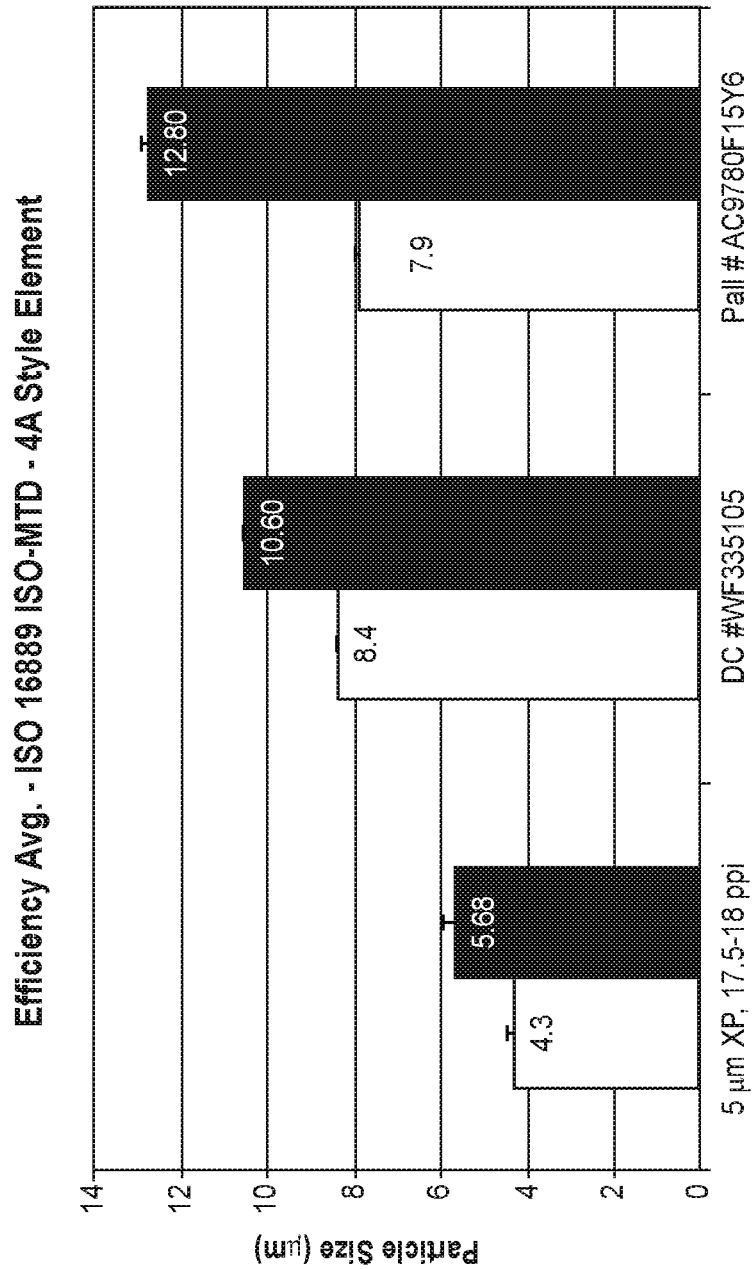
FIG. 13 depicts comparative test data associated with particle efficiency associated with the technology disclosed herein.

Multiple 5-micron XP filter elements having a linear pleat density between 17.5-18 PPI (corresponding to a total pleat count of about 65), was tested against multiple Pall filter elements having Prod. No. AC9780F15Y6 and Donaldson filter elements having Prod. No. WF335105, reflected in Table 1 and described above. Procedures outlined in ISO 16889 with 4A-style filter elements, ISO-medium test dust, 12 GMP of hydraulic fluid, 90 psi terminal pressure drop, and an upstream concentration of 2 mg/L were used for testing. FIG. 11 shows comparative data of filter element dust holding capacity, FIG. 12 shows comparative data of filter element clean pressure drop, and FIG. 13 shows comparative data of particle efficiency. The results were averaged for each type of filter element. Each of these FIGS. 11-13 shows error bars corresponding to a 95% confidence interval.

FIG. 11 demonstrates that the 5-micron XP filter element consistent with the technology disclosed herein has improved dust loading capacity compared to the Donaldson fiberglass (DC #WF335105) and Pall (#AC9780F15Y6) filter elements. Generally in the hydraulic fluid filtering industry the absolute minimum dust loading capacity requirement for a corresponding filter element is about 5.6 grams. Filter elements consistent with the technology disclosed herein that are 4A style will generally have a dust loading capacity greater than 7 grams. FIG. 12 demonstrates that the clean pressure drop is slightly greater than the Donaldson fiberglass filter element, and about equal to the Pall filter element. Generally in the hydraulic fluid filtering industry, the expectation is that the clean pressure drop be at least less than 7.5 psid. Filter elements consistent with the technology disclosed herein that are 4A style will generally have a pressure drop of less than 7 psid.

FIG. 13 depicts the beta efficiency testing results for 5-micron XP filter element and demonstrates that the filter element has improved particle efficiency over the Donaldson fiberglass and Pall filter elements. The efficiency of the filter can be calculated directly from the beta ratio because the filter efficiency=1−(1/beta)×100. The filter elements consistent with the technology disclosed herein can have an efficiency associated with 10 micron particles of at least 90%, at least 92%, at least 95%, at least 97%, at least 99%, and sometimes at least 99.5%. In a variety of embodiments the filter elements consistent with the technology disclosed herein have an efficiency associated with 10 micron particles of at least 99.6%. In some embodiments the filter elements consistent with the technology disclosed herein have an efficiency associated with 10 micron particles of at least 99.7% and even 99.8% or 99.9%. While the filtering efficiencies were calculated using the 4A style filter elements, such filter efficiencies are generally consistent regardless of the size of the filter element.

The 5-micron XP filter elements discussed above with reference to FIGS. 8-9 and 11-13 are 4A-style filter elements that generally have a length of 4.438 inches, an outer diameter of 1.75 inches, and an internal passageway diameter of about 1.005 inches. In a second embodiment, the 5-micron XP filter element is consistent with Donaldson Product No. W344865, and is a filter element constructed similarly to as disclosed in FIGS. 1-3 and 6-7 and has a length of about 7.240 inches, an outer diameter of about 1.985 inches, and an internal passageway diameter of about 1.000 inches. The larger size of the filter element of the second embodiment compared to the 4A style size generally results in more media being available for filtration, more surface area for dust loading, and higher pressure drop in filtration compared to the 4A style element. The chart below shows test comparison data for filters having similar sizes including Donaldson Product No. W344865 and Pall Product No. ACC314F16Y1.

TABLE 2

| Product | Capacity (grams) | Clean DP (psid) | $\beta_{200}$ | Effective Pleat Count |
|---|---|---|---|---|
| W344865 | 12.44 | 10.8 | 4.2 | 69 |
| W344865 | 12.75 | 10.6 | 4.1 | 69 |
| ACC314F16Y1 | 9.52 | 11.1 | 4 | 66 |
| ACC314F16Y1 | 10.29 | 11.3 | 4.4 | 66 |

For some embodiments of the filter elements that have been described herein as the subject of the current application the dust holding capacity is generally greater than 7 grams, the clean pressure drop is less than 11 psid, and the $\beta_{200}$ particle size is less than 5 microns. For some example embodiments of 4A-style filter elements consistent with the subject of the current application, the dust capacity can be greater than 7.5 grams, the pressure drop can be less than 7 psid, and the $\beta_{200}$ particle size is less than 7 microns. For some example embodiments of consistent with the second embodiment of 5-micron XP filter elements, disclosed above, the dust capacity can be greater than 10.6 grams, the pressure drop can be less than 11.1 psid, and the $\beta_{200}$ particle size is less than 4.5 microns. Other ranges of filter performance are possible, as well.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged," and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. A method of forming a filter element comprising: providing a media layer, a second media layer, a support layer system, and a first wire mesh layer, wherein the second media layer has a mean flow pore size smaller than the first media layer; folding each of the first media layer, the second media layer, the support layer system, and the first wire mesh layer to form pleats at a linear pleat density of at least 8 pleats per inch, wherein each of the pleats has an equal pleat height; compressing the pleats of the first media layer, the second media layer, the support layer system, and the first wire mesh layer to a linear pleat density of at least 17 pleats per inch; layering the first media layer, the second media layer, the support layer system, and the first wire mesh layer to form a filter element having an upstream side and a downstream side; and forming a tubular shape with the first media layer, the second media layer, the support layer system, and the first wire mesh layer to result in a pleat packing density of at least 100%.

2. The method of claim 1, further comprising layering each of the first media layer, the second media layer, the support layer system, and the first wire mesh layer before folding, wherein folding comprises co-pleating the layers.

3. The method of claim 1, wherein folding comprises forming the pleats at a linear pleat density of at least 13 pleats per inch.

4. The method of claim 1, wherein compressing occurs after layering the first media layer, the second media layer, the support layer system, and the first wire mesh layer.

5. The method of claim 1, further comprising cutting the first media layer, the second media layer, the support layer system, and the first wire mesh layer into a segment.

6. The method of claim 5, wherein the cutting occurs after folding and before compressing.

7. The method of claim 1, further comprising providing a second wire mesh layer; folding the second wire mesh layer; and compressing the second wire mesh layer to a linear pleat density of at least 17 pleats per inch.

8. The method of claim 1, further comprising, after compressing, forming a panel filter element by securing the perimeter of the first media layer, second media layer, first wire mesh layer, and support layer system to a filter frame.

9. The method of claim 1, wherein the bubble point of the filter element is no less than 75% of its bubble point at a lower pleat density.

10. The method of claim 1, wherein the filter element has a dust holding capacity greater than 7 grams.

11. The method of claim 1, wherein the filter element has a pressure drop of less than 11 psid.

12. The method of claim 1, wherein each filter media layer has a burst strength of at least 11 psi.

13. The method of claim 1, wherein the filter element has a clean pressure drop of at less than 7 psid.

14. The method of claim 1, wherein the filter element has a dust holding capacity of greater than 10 grams.

15. The method of claim 1, wherein the filter element has a $\beta 200$ particle size rating of less than 7 microns.

16. The method of claim 1, wherein the filter element is chemically compatible with flame retardant hydraulic fluid.

17. The method of claim 1, wherein a ratio of the mean flow pore size of the first media layer to the second media layer is greater than 2.4.

18. The method of claim 1, wherein the ratio of the maximum pore size of the first media layer to the second media layer is greater than 2.8.

* * * * *

UNITED STATES PATENT AND TRADEMARK OFFICE
CERTIFICATE OF CORRECTION

| | |
|---|---|
| PATENT NO. | : 11,376,526 B2 |
| APPLICATION NO. | : 16/875091 |
| DATED | : July 5, 2022 |
| INVENTOR(S) | : James P. Barsness et al. |

It is certified that error appears in the above-identified patent and that said Letters Patent is hereby corrected as shown below:

In the Claims

In Claim 1 Line 53, the word 'first' should be before 'media'.

Signed and Sealed this
Second Day of May, 2023

*Katherine Kelly Vidal*

Katherine Kelly Vidal
*Director of the United States Patent and Trademark Office*